United States Patent
Fronte et al.

(10) Patent No.: US 7,337,300 B2
(45) Date of Patent: Feb. 26, 2008

(54) PROCEDURE FOR PROCESSING A VIRTUAL ADDRESS FOR PROGRAMMING A DMA CONTROLLER AND ASSOCIATED SYSTEM ON A CHIP

(75) Inventors: Daniele Fronte, Aix-en-Provence (FR); Jean Nicolai, Chateauneuf le Rouge (FR); Albert Martinez, Bouc Bel Air (FR)

(73) Assignee: STMicroelectronics SA, Montrouge (FR)

( * ) Notice: Subject to any disclaimer, the term of this patent is extended or adjusted under 35 U.S.C. 154(b) by 281 days.

(21) Appl. No.: 11/154,281

(22) Filed: Jun. 16, 2005

(65) Prior Publication Data

US 2006/0010262 A1    Jan. 12, 2006

(30) Foreign Application Priority Data

Jun. 18, 2004  (FR)  .................................. 04 06666

(51) Int. Cl.
  *G06F 9/34* (2006.01)
  *G06F 9/26* (2006.01)
  *G06F 12/00* (2006.01)
(52) U.S. Cl. ........................ 711/203; 711/202; 711/212; 711/220; 711/221
(58) Field of Classification Search ................ 711/203, 711/202, 212, 220, 221
  See application file for complete search history.

(56) References Cited

U.S. PATENT DOCUMENTS

| 4,849,875 A | 7/1989 | Fairman et al. |
| 5,887,190 A | 3/1999 | Priem et al. |
| 5,890,220 A | 3/1999 | Mochida et al. |

FOREIGN PATENT DOCUMENTS

EP  0447 145  9/1991

OTHER PUBLICATIONS

French Preliminary Search Report dated Jan. 25, 2005 for French Application No. 04 06666.
Markatos & Katevenis; User-Level DMA without Operating System Kernel Modification; Mar. 1997; pp. 322-331; 0-8186-7764; Heraklion, Crete, GR.

(Continued)

*Primary Examiner*—Hyung Sough
*Assistant Examiner*—Shawn Eland
(74) *Attorney, Agent, or Firm*—Lisa K. Jorgenson; Stephen Bongini; Fleit Kain Gibbons Gutman Bongini & Bianco, P.L.

(57) ABSTRACT

A method is provided for processing a virtual address for a program requesting a DMA transfer. The program is designed to be run in user mode on a system on a chip that includes a central processing unit, a memory management unit, and a DMA controller. The virtual address is a source virtual address or a destination virtual address and has a size of N bits. According to the method, the virtual address is divided into at least two fields of bits. For each of the fields, there is created an N-bit address word comprising a prefix having a given value associated with the field and having more than 1 bit, and the field. The DMA controller is programmed using multiple store instructions that include one store instruction relating to each of the address words created.

20 Claims, 2 Drawing Sheets

OTHER PUBLICATIONS

Blumrich, Dubnicki, Felten & Li; Protected, User-level DMA for the SHRIMP Network Interface; Apr. 1996; pp. 154-165; 0-8186-7237; Princeton, NJ. (USA).

Heinlein, Gharachorloo, Dresser & Gupta; Integration of Message Passing and Shared Memory in the Stanford FLASH Multiprocessor; Oct. 1994; pp. 1-13; Proceedings of the Sixth International Conference on Architectural Support for Programming Languages & Operating Systems (ASPLOS) ; Stanford, CA.

PROCEDURE FOR PROCESSING A VIRTUAL ADDRESS FOR PROGRAMMING A DMA CONTROLLER AND ASSOCIATED SYSTEM ON A CHIP

CROSS-REFERENCE TO RELATED APPLICATIONS

This application is based upon and claims priority from prior French Patent Application No. 04 06666, filed Jun. 18, 2004, the entire disclosure of which is herein incorporated by reference.

FIELD OF THE INVENTION

The present invention relates to the field of silicon integrated systems or SoC (System on a Chip), and more specifically to the programming of the DMA controller of an SoC.

BACKGROUND OF THE INVENTION

A silicon integrated system or System on a Chip (SoC) includes at least a central processing unit (CPU) on which programs are run, a direct memory access controller (DMA controller), a memory and a memory management unit. Such SoCs are typically integrated in electronic devices such as general purpose computers, decoder boxes or "Set Top Boxes", personal digital assistants or PDAs, mobile telephones, etc.

In physical memory, a variable size memory space is dynamically allocated to each application program or user program. More specifically, each user program has access to only some of the physical memory pages. These pages form a memory space (which may be discontinuous) which is addressed at memory bus level by physical addresses, but which is known to the user program via an address space (normally continuous), called a virtual address space, which the program accesses with virtual addresses. The virtual address space is specific to the user program. The relationship that links the virtual addresses in the address space and the physical addresses in the physical memory is stored in the form of a translation table, called a page table, which is managed by the operating system and stored in the main memory. The latest address translations computed by the MMU table reloading unit are stored in a specific cache memory called a TLB (Translation Look-aside Buffer).

Each entry of the TLB, that is, each line corresponding to a translation in the TLB, comprises an address space identifier (ASID) to distinguish identical virtual addresses in different address spaces. Each ASID is linked, on a one-to-one basis, to a defined address space of the system.

The DMA controller performs data transfers between the internal memory of the SoC and peripheral memory devices (for example, hard disks) based on information supplied to the DMA controller. This information comprises the source physical address of the transfer, the destination physical address of the transfer and the size of the memory area to be transferred.

Conventionally, a program requiring programming of the DMA controller for a DMA transfer running on the SoC in user mode (also called application mode or non-privileged mode) supplies a virtual address, which is the virtual address of the source of the DMA transfer or the destination of the DMA transfer, to the operating system (OS). The OS, running in privileged mode (also called the supervisor mode or kernel mode) then takes control, translates the supplied virtual address into a corresponding physical address. It requires in turn storage of the source physical address of the transfer obtained in the source register, storage of the destination address in the destination register and storage of the size in the size register, and this from the register virtual address. The OS then supervises the transfer performed by the DMA controller based on the information stored in its registers and notifies the program initiating the request of the result of the transfer.

The store instructions normally used are of the type: "STORE pa_src@dma_src_reg_adr", "STORE pa_dest@dma_dest_reg_adr" and "STORE size@dma_size_reg_adr", in which "pa_src" is the source physical address, "pa_dest" is the destination physical address, "size" is the size of the memory area to be transferred, "dma_src_reg_adr", "dma_dest_reg_adr" and "dma_size_reg_adr" are respectively the virtual addresses of the source, destination and size registers. The first instruction above in plain language means "store the data corresponding to the source physical address "pa_src" in the source address register of the DMA controller whose virtual address is "dma_src_reg_adr"". This instruction therefore supplies a virtual address argument "dma_src_reg_adr" and a data argument "pa_src" to be stored at the address supplied as an address argument.

With reference to FIG. 1 which shows an example of a conventional SoC, the conventional programming path for the DMA controller is as follows: the virtual address "dma_src_reg_adr" is supplied by the CPU to the MMU over the virtual address bus VA. The MMU translates it into a physical address, checks the rights of access to this physical address, then applies this physical address to the physical address bus PA, via which this physical address is made available in particular to the DMA controller on the general bus A which is linked to a set of entities comprising, for example, disk controllers, physical memory, etc.

In parallel, the source physical address "pa_src" is applied by the CPU to the data bus DAT, from which this physical address is made available on the general data bus D also linked to the set of entities.

The translation is performed by the MMU using a translation table.

A number of attempts have recently been made to program the DMA controller directly by a program running in user mode, instead of by the OS. This stems in particular from the very high proportion of the time required for programming of the DMA controller by the OS, compared to the data transfer time itself that is achieved by the DMA controller.

One of the difficulties encountered originates from the fact that the registers of the DMA controller must be programmed with physical addresses, whereas the programs in user mode do not have access to them and it is not desirable, particularly for security reasons, for these programs to have access to them.

Solutions are proposed in the documents "User-Level DMA without Operating System Kernel Modification", by Evangelos P. Markatos and Manolis G. H. Katevenis (Institute of Computer Science, Science and Technology Park of Crete, 1997 IEEE), "Protected User-Level DMA for the Shrimp Network Interface", by M. A. Blumrich et al. (Proc of the 2$^{nd}$ International Symposium on High Performance Computer Architecture, pages 154-165, February 1996) and "Integration of Message Passing and Shared Memory in the Stanford Flash Multi-Processor", by J. Heinlein et al. (Proc.

of the 6th International Conference on Architectural Support for Programming Languages and Operating Systems, pages 38-50, 1994).

According to these solutions, the user program runs an existing store instruction of the type of STORE instruction described above, but places as the address argument, the source or destination virtual address that the user program wants to program in the DMA controller, and not the address of the register of the DMA controller to be programmed. The effect of this is to force the MMU to translate the source or destination virtual address supplied into the corresponding physical address. This technique also enables the MMU to check that the user program does indeed have the right to access the address.

Two additional difficulties had to be taken into account. First of all, it is essential to ensure that the DMA controller receives this physical address which is present on the address bus A, and writes it as data into its source or destination register. Moreover, it is also essential to allow the memory area to which the physical address applied on the bus corresponds, to disregard the "STORE" instruction because this instruction is not addressed to this memory area.

The above-mentioned document provides a solution to these problems. This solution consists in setting to 1 the most significant bit (MSB) of the source or destination address of a DMA transfer before this address is supplied to the MMU. Thus, the DMA controller receives, using its appropriate state machine, as data to be stored in one of its registers, any word including an MSB at 1.

This solution therefore performs implicit addressing (or "shadow addressing"), based on the "STORE" instruction and the prefix 1.

The drawback of this technique is that the system must not include any memory area or peripheral device with an address beginning with 1, which halves the addressable memory space that is actually available. Thus, for a 32-bit (or 4 GB) system, the addressable memory space in practice is reduced by half, to $2^{31}$ bits (or 2 GB), which is very detrimental.

SUMMARY OF THE INVENTION

It is an object of the present invention to overcome this drawback.

A first embodiment of the present invention provides a method for processing a virtual address in a process for programming a DMA controller. The process is designed to be run in user mode on a system on a chip that includes a central processing unit, a memory management unit, and a DMA controller. The virtual address is a source virtual address or a destination virtual address having a size of N bits. According to the method, the virtual address is divided into at least two bit fields. For each of the fields, there is created an N-bit address word comprising a prefix of a given value associated with the field and encoded on greater than 1 bit, and the field. The DMA controller is programmed using a plurality of store instructions that include one store instruction relating to each of the address words created.

This method is advantageously applied in a user program. Such a method reduces the available space by far less than in conventional solutions, while preserving the fact that the user program does not manipulate the physical addresses, and the fact that the MMU runs a check on the rights of the program on its DMA controller programming request.

A second embodiment of the present invention provides a computer program for programming a DMA controller from a source virtual address or a destination virtual address having a size of N bits. The computer program is designed to be run in user mode on a system on a chip that includes a central processing unit, a memory management unit, and a DMA controller. The program comprises instructions for dividing the virtual address into at least two bit fields; creating, for each of the fields, an N-bit address word comprising a prefix of a given value associated with the field and encoded on greater than 1 bit, and the field; and programming the DMA controller using a plurality of store instructions that include one store instruction relating to each of the address words created.

A third embodiment of the present invention provides a system on a chip that includes a memory management unit, a central processing unit, an address processing block, and a DMA controller.

The central processing unit, when executing in user mode a store instruction that includes at least one address argument, supplies the address argument to the address processing block via a first address bus. The address processing block includes a first module for performing a process on address words that include a first given prefix value that is encoded on at least 2 bits, and a memory management unit for translating, according to a predefined table, a received virtual address word comprising N bits into a corresponding physical address word. The address processing block also includes a routing block for detecting at least the first prefix value and a second given prefix value, which is also encoded on at least 2 bits, in a received virtual address word, and selectively supplies the received address word to the memory management unit, the first module of the address processing block, or a second address bus. The address processing block, when a virtual address word input to the address processing block includes the first prefix value, delivers to the second address bus an address word comprising the first prefix value and bits obtained by translating a virtual address into a corresponding physical address in accordance with the predefined table. The virtual address to be translated is determined at least partly as a function of bits located after the prefix of the virtual address word supplied to it as input. The DMA controller includes a source address register, a data address register, a size register, and a state machine. The state machine detects the first prefix value or the prefix second value in an address word received from the second address bus, and stores in the source register or the destination register at least bits extracted from a first location in an address word comprising the first prefix value or bits extracted from a second location in an address word comprising the second prefix value. The first or second location is predefined and located after the prefix value.

Preferably, the source, destination and size registers are filled in succession and always according to the same sequence, so that the state machine receiving information knows in which type of register to store it.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 2:
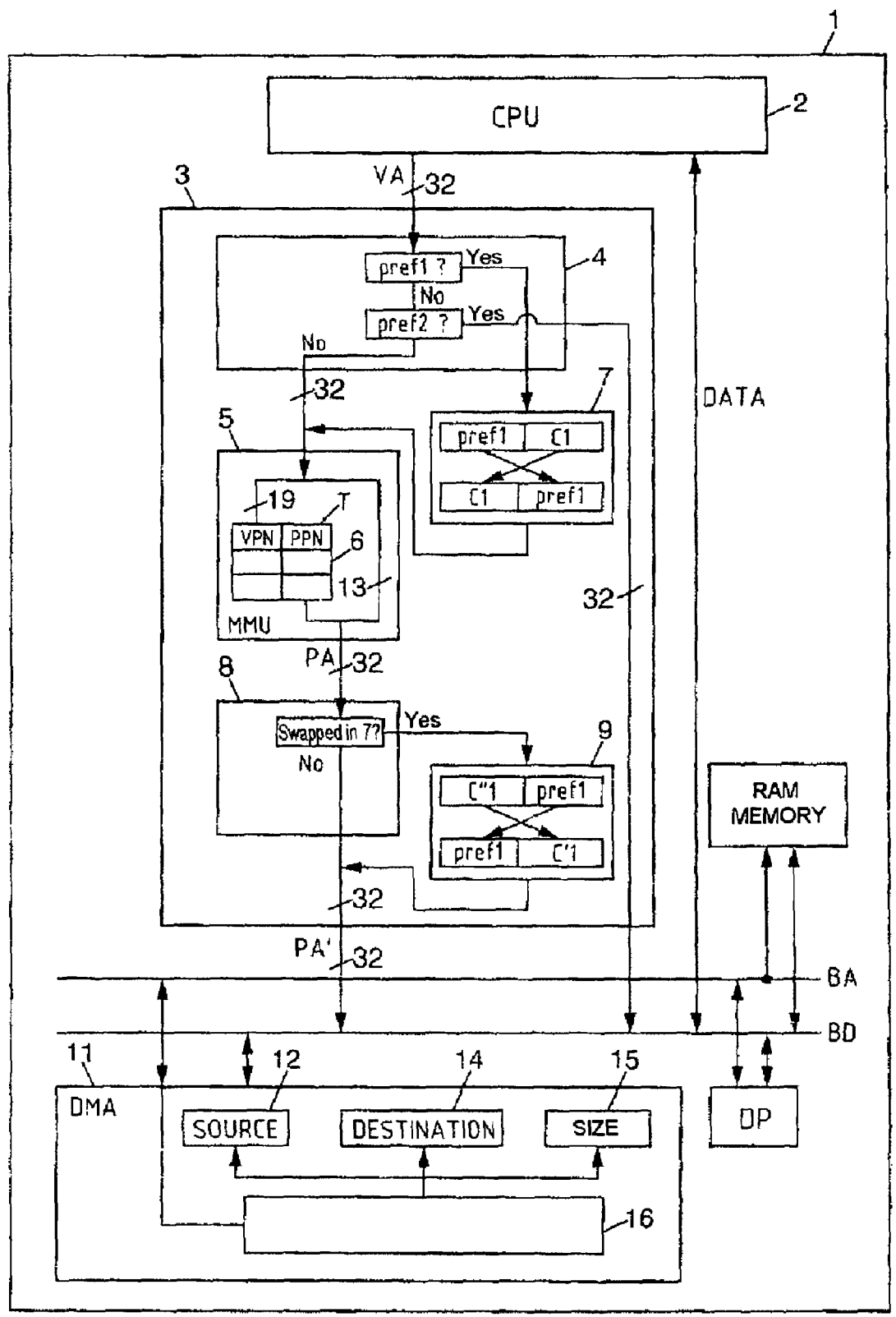
FIG. 2 represents a system on a chip according to an embodiment of the present invention.

FIG. 2 shows a system on a chip (SoC) according to an embodiment of the present invention. In this embodiment, the system on a chip 1 has an N-bit standard architecture, in which a virtual address is presented in the form of a number forming a virtual page address encoded on the p high order bits or VPN (Virtual Page Number), followed by an offset in the page encoded on the low order bits.

The architecture considered below is a 32-bit architecture and uses 8 kilobyte pages. The present invention can, however, be implemented in any type of architecture made up of pages of any size.

Each virtual address considered here therefore comprises 19 first high order bits (p=19) indicating the page. This VPN is followed by 13 low order bits indicating the offset.

The system on a chip 1 represented in FIG. 2 comprises a central processing unit or CPU 2. The system on a chip 1 also comprises an address processing block 3, which is linked to the CPU 2 via a virtual address bus VA.

The address processing block 3 comprises a first logical block 4 designed to selectively supply a 32-bit address word, which is supplied to it as input, to various entities of the SoC, according to the presence in the word of a prefix of value pref1 or pref2 in the highest order bits of the word. The address processing block 3 furthermore comprises a memory management unit or MMU 5, two swap modules 7 and 9, and a second logical block 8.

The first logical block 4 operates in the following way. If in a word received by the first logical block 4 the highest order bits are equal to pref1, then the word is delivered to the first swap module 7. If in a word received by the first logical block 4 the highest order bits are equal to pref2, then the word is delivered directly to the general address bus BA. Otherwise, the word is supplied to the MMU 5.

The MMU 5 translates a 32-bit virtual address that is supplied to the MMU as input, by translating only the highest order bits indicating the page (in this case, the first 19 bits) so as to translate the VPN into a physical page number (PPN), using a predetermined table T. The MMU 5 also checks that the application initiating the translation does indeed have the appropriate rights.

The first swap module 7 swaps a number N-p of high order bits (in this case 13) of a 32-bit address supplied as input with the p (in this case 19) low order bits and delivers the resulting address to the MMU 5 for translation.

The second logical block 8 is linked to the MMU 5 via a physical address bus PA. The second logical block 8 is designed to selectively supply a physical address word, which is supplied to it as input, to different entities of the SoC, according to whether there has been detection in the first logical block 4 of the value pref1 followed by a swap in the first swap module 7 on the virtual address word from which the physical address word is derived. The second logical block 8 operates as follows. If the first swap module 7 has just performed a swap, then the physical address leaving the MMU is delivered to a second swap module 9. Otherwise, it is delivered to the general address bus BA.

The second swap block 9 swaps the p (in this case 19) high order bits of a 32-bit address supplied as input with the N-p (in this case 13) low order bits.

The address words processed by the address processing block 3 are delivered via a bus PA' to the general address bus BA.

The system on a chip 1 furthermore comprises a DMA controller 11, which includes a source register 12, a destination register 14 and a size register 15. It also comprises a state machine 16 designed to detect the presence, in the high order bits of an address word present on the address bus BA, of the prefix pref1 or the prefix pref2, and to store in the registers data deriving from such words. In this embodiment, the state machine 16 operates as follows. For this particular DMA transfer program, the machine 16 uses this data to fill first the source register, then the destination register and finally the size register.

When the high order bits of a word received in the context of a given DMA transfer program are equal to the prefix of value pref1, the state machine 16 is designed to store the last 19 bits of the word received in the high order bits of the source or destination register currently being filled. And when the high order bits of a word received are equal to the prefix of value pref2, it is designed to store the 13 bits following the prefix in the word received as low order bits in the register currently being filled. Once the register is filled in this way, the state machine, if receiving data relating to the above mentioned program, goes on to fill the next register to be filled (according to the source/destination/size sequence).

The general address bus BA interconnects the address processing block 3, the DMA controller 11, the CPU 2, peripheral devices DP, a RAM memory, etc.

Similarly, a data bus BD interconnects these various entities.

The numbers (13, 19, and 32) appearing next to the interconnecting buses in FIG. 2 indicate the number of bits in the words passing along these buses.

In one embodiment of the present invention, a user program P is run in user mode in the SoC 1. It requests programming of the DMA controller in order to perform a transfer. Such a program P is for example a DMA driver. Given that certain DMA drivers can now be downloaded from the Internet and are consequently liable to be corrupted, they are made to run in user mode and no longer in privileged mode.

Figure 1:
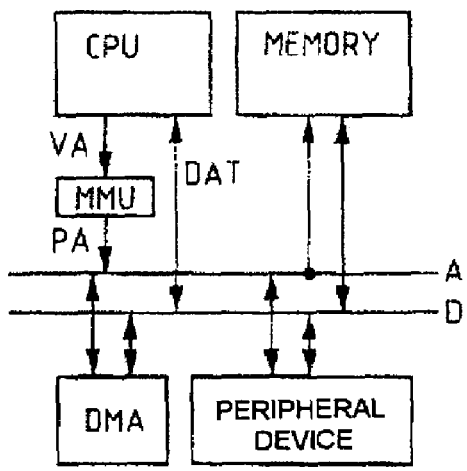
FIG. 1 is a representation of a conventional system on a chip.
Figure 3:
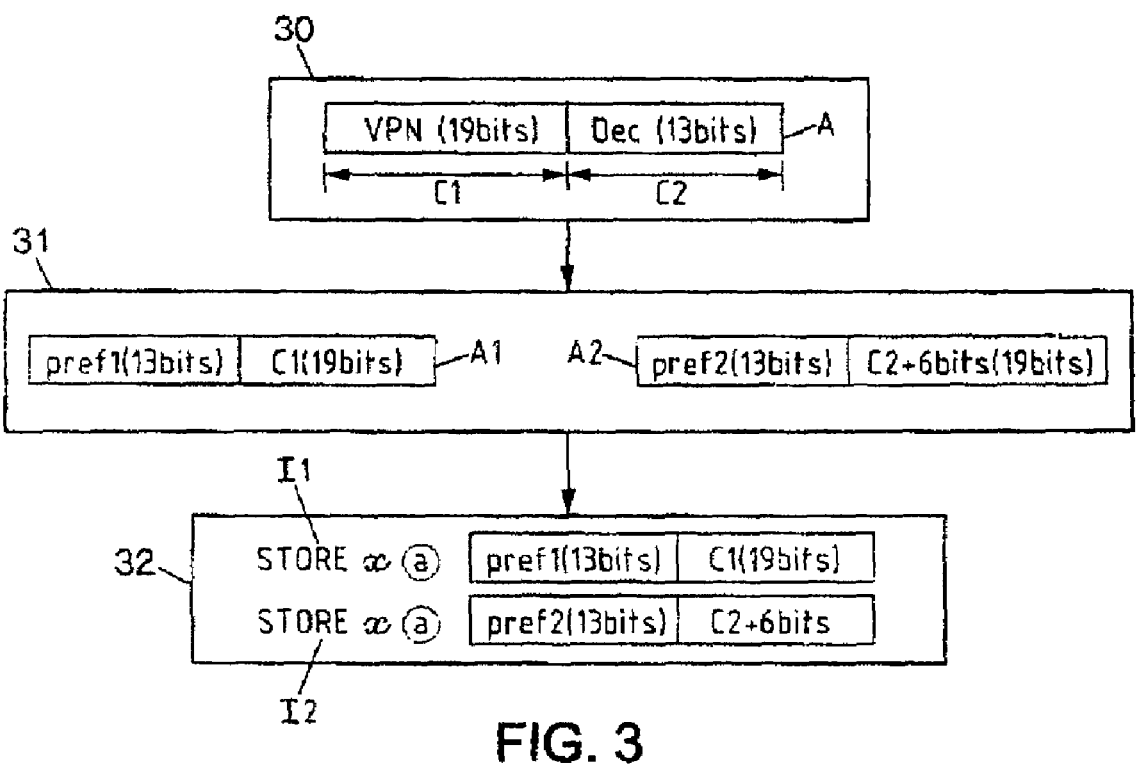
FIG. 3 is a representation of the steps of a user program in an embodiment of the present invention.

The program P, in step 30 of FIG. 3, divides a DMA transfer source virtual address A into two fields C1 and C2. The first field C1 comprises the 19 high order bits indicating the page VPN1. The second field C2 comprises the 13 low order bits indicating the offset.

In step 31, the user program P creates a first 32-bit word A1 comprising a 13-bit prefix having a first value pref1, followed by the 19-bit field C1. It also creates a second 32-bit word A2 comprising a 13-bit prefix having a second value pref2 (which is different from pref1 in this embodiment), followed by the field C2, completed with any six low order bits.

The values pref1 and pref2 have been determined in a preliminary DMA programming rules definition step.

In step 32, the user program programs the DMA controller using two successive store instructions comprising the following address and data arguments:

instruction I1: STORE x @ A1; and
instruction I2: STORE x @ A2.

The information x is, in some embodiments, an identifier of the user program P, that is, all the store instructions executed for a DMA transfer required by a particular user program and relating to the storage of source, destination and size information will include the same identifier x.

These instructions are then processed sequentially, as will now be explained with reference to FIG. 2, by the CPU 2.

The CPU 2, processing each of these instructions, delivers the information x to the data bus BD via the data bus DATA.

Also, the address A1 and then the address A2 are sent successively by the CPU 2 to the routing first logical block 4 of the address processing block 3, on processing the instruction I1 and then the instruction I2.

Since the virtual address A1 includes a prefix having the value pref1, this initial address is delivered by the routing first logical block 4 to the first swap module 7, which outputs the virtual address word A1' to the MMU 5.

The address word A1', comprising 32 bits, thus has as its highest order bits the 19 bits of the VPN derived from the word A1, which are followed by the bits of the prefix of value pref1.

In the MMU 5, the word A1' is translated into a word A1" in accordance with the table T, according to the 19 high order bits.

The address word A1", comprising 32 bits, thus has as its highest order bits, the 19 bits of the PPN1 supplied by the table, and as its lowest order bits, those encoding the value pref1 of the prefix.

Then the address word A1" is supplied via the bus PA to the second logical block 8, which, knowing that the first swap module 7 has performed a swap, delivers A1" to the second swap module 9. This second swap module 9 delivers to the address bus BA a word A1'" which comprises 13 highest order bits equal to the prefix of value pref1, and 19 lowest order bits equal to PPN1.

Regarding the virtual address A2 delivered by the CPU 2 to the address processing block 3, since it includes highest order bits corresponding to the coding of the value pref2, it is delivered by the routing first logical block 4 directly to the general address bus BA, typically by a bypass device.

The state machine 16 of the DMA controller 11 detects the presence of pref1 in the highest order bits of A1'" present on the bus BA and then fills the first 19 bits of the source register with PPN1; then it detects the presence of pref2 in the highest order bits of A2 on its application to the address bus BA and fills the 13 bits after PPN1 in the source register, with the field C1 corresponding to the offset.

Programming of the source register of the DMA controller is thus completed.

The destination register is filled in a similar way to that described above for the source register.

The information for filling the size register can be supplied by a conventional instruction of the type STORE size @ dma_size_reg_adr. The state machine 16 will be notified, by the presence on the address bus BA, of physical address data corresponding to the virtual address dma_size_reg, that the data present on the data bus BD is to be stored in the size register.

Moreover, in one embodiment, the data argument x supplied to the DMA controller on the data bus BD in parallel with the transmission on the general address bus BA of the source address, and also in parallel with the transmission on the general address bus BA of the destination address, is designed to enable the state machine to ensure the atomicity of the various instructions corresponding to a particular programming of the DMA controller comprising a source address, a destination address and a size. This characteristic enables the state machine in particular, when this machine is able to complete in parallel several triplets of source, destination and size type registers for several programs, to complete the correct registers. In this case, the state machine chooses the triplet of registers to be filled, on receiving information on the general address bus BA, according to the argument x present at the same time on the data bus BD.

In preferred embodiments, x is equal to the ASID.

Compared to the conventional implicit addressing method, the detection by the state machine of the DMA controller is no longer based on the value of a single bit at 1, but on the presence of two prefixes, in this case of 13 bits. Compared to the conventional operation, for the state machine there are two steps, and not just one for filling a register.

Moreover, the logical blocks 4 and 8 can be implemented by a first logical control device detecting the prefix of value pref1 and controlling the two swap blocks 7 and 9 accordingly, and a second logical control device detecting the prefix of value pref2 and controlling the bypass device accordingly.

In some embodiments, the components corresponding to the first logical block 4 are integrated in the component in which the CPU 2 is implemented, or even in the component in which the MMU 5 is implemented.

In some embodiments, the components corresponding to the second logical block 8 are integrated in the component in which the MMU 5 is implemented, or even in the component in which the physical address bus PA' is implemented.

Thus, it emerges from the embodiment described above, that the present invention can be used to perform a programming of a DMA controller without leaving the user program P to manipulate the physical addresses and furthermore allowing the rights it holds to be checked by the MMU. The program P does not have direct access to the registers of the DMA controller and cannot therefore write whatever it wants to them. Compared to the conventional implicit addressing techniques, it wastes far less of the available space. In practice, in the case described above with two different prefixes pref1 and pref2, $2 \times 2^{19}$ memory locations are lost, which is far less than the loss according to the conventional implicit addressing techniques described above.

Furthermore, preferred embodiments of the present invention do not cause any significant slowing down of the processes performed by the MMU 5 on addresses not intended for the DMA controller.

Embodiments of the present invention also do not require new instructions to be created. They use an existing instruction twice (or more, if it is decided to divide into more than two fields) whereas in the conventional technique it was used only once to program a source (or destination) address.

The embodiment described above is particularly advantageous, since it allows for the use of a system on a chip comprising a CPU, an MMU and a DMA controller, all standard, and simply involves a few additional components (two swap devices and one bypass) and an appropriate DMA controller state machine.

In another embodiment, a single prefix value is used. In other words, pref1 is equal to pref2. The system on a chip will then be designed to process a first word received for programming of the DMA controller presenting the single prefix as indicated above for A1, and to process as indicated for A2 above, the word arriving for programming of the DMA controller after this first word. In this case, there is no more need for a mechanism for detecting the second prefix value, or for a bypass. The arrival of the first word with the prefix is processed as a word presenting a prefix having the first value, and the arrival of the second word presenting the prefix is processed as a word presenting a prefix having the second value.

Moreover, in the embodiment described with reference to FIGS. 2 and 3, a source or destination virtual address A gives rise to two implicit store instructions with two address words A1 and A2 created according to A as address arguments. In other embodiments, the address A is divided into a number of fields greater than 2. The number of prefixes can then also be greater than 2. As many implicit instructions will then be executed as there are fields. Each instruction will include, as its address argument, an N-bit word (if the architecture is on N bits) created from a prefix and from a field which may be complemented with other bits. That way, one or more of the prefixes used can include a higher number of bits than the size of the offset; memory space wastage will be further reduced. However, the changes to be made to the standard components (MMU, CPU, bus, and DMA controller) of the SoC will be more extensive, in particular for reconstructing the translated word in the registers. And if the VPN is not entirely contained in one of the words created, a device will be needed to reconstruct the VPN before having it translated by the MMU.

In the embodiment described with reference to FIGS. 2 and 3, the fields are inserted in a compact way immediately after the prefix. In other embodiments, the placement of the bits of the field in the word created can be different. The SoC and the state machine of the DMA controller must be adapted accordingly.

In another embodiment where the breakdown by the user program is similar to that described with reference to the figures by the program P, the SoC can comprise a specific MMU to which the words created including the VPN are directed, typically A1, and which is designed to translate such words directly. It will perform the translations in accordance with the table T used by the MMU 5, but will take into consideration for this the last 19 bits, and not the first 19 bits of the word input. The swap modules are then no longer needed and the address word A1 then no longer has to be supplied to the standard MMU 5.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for processing a virtual address in a process for programming a DMA controller, the process being performed in user mode on a system on a chip that includes a central processing unit, a memory management unit, and a DMA controller, the virtual address being a source virtual address or a destination virtual address and having a size of N bits, said method comprising the steps of:
dividing the virtual address into at least two fields of bits;
for each of the fields, creating an N-bit address word comprising the field, and a prefix of a given value associated with the field and having more than 1 bit; and
programming the DMA controller using a plurality of store instructions, the store instructions including one store instruction relating to each of the N-bit address words created.

2. The method according to claim 1, wherein the virtual address comprises a number p of first bits which determine a page followed by a number N-p of bits which determine an offset in the page.

3. The method according to claim 2, wherein each of the store instructions is an instruction including a data argument to be placed on a data bus and an address argument to be placed on an address bus, the address argument including an address word that is created in the creating step such that the address word begins with one of the prefixes and includes one of the fields after the one prefix.

4. The method according to claim 2, wherein in the dividing step, the virtual address is divided into first and second fields, the first field of the virtual address comprising at least the p bits determining the page, and the second field of the virtual address comprising at least the N-p bits determining the offset.

5. The method according to claim 4, wherein the first field consists of the p bits determining the page.

6. The method according to claim 4, wherein the second field consists of the N-p bits determining the offset.

7. The method according to claim 1, wherein in the programming step, the store instruction relating to an address word that is created so as to include one of the prefixes and one of the fields is a store instruction of the implicit addressing type based on the prefix.

8. The method according to claim 1, wherein in the creating step, the same prefix is used for each of the fields.

9. A computer-readable storage medium encoded with a computer program for programming a DMA controller from a virtual address that is a source virtual address or a destination virtual address having a size of N bits, the computer program being designed to be run in user mode on a system on a chip that comprises a central processing unit, a memory management unit, and a DMA controller, the computer program comprising instructions for performing the steps of: dividing the virtual address into at least two fields of bits; for each of the fields, creating an N-bit address word comprising the field, and a prefix of a given value associated with the field and having more than 1 bit; and programming the DMA controller using a plurality of store instructions, the store instructions including one store instruction relating to each of the N-bit address words created.

10. A system on a chip comprising:
an address processing block;
a central processing unit for, when executing in user mode a store instruction that includes at least one address argument, supplying the address argument to an address processing block via a first address bus; and
a DMA controller that includes a source address register, a data address register, a size register, and a state machine,
wherein the address processing block includes:
a first module for performing a process on address words that include a first prefix value that is encoded on at least 2 bits;
a memory management unit for translating, according to a table, a received virtual address word comprising N bits into a corresponding physical address word; and
a routing block for detecting at least the first prefix value and a second prefix value, which is also encoded on at least 2 bits, in a received virtual address word, and selectively supplying the received address word to the memory management unit, the first module of the address processing block, or a second address bus, when a virtual address word input to the address processing block includes the first prefix value, the address processing block delivers to the second address bus an address word comprising the first prefix value and bits obtained by translating a virtual address into a corresponding physical address in accordance with the table, the virtual address to be translated being determined at least partly as a function of bits located after the first prefix value in the virtual address word input to the address processing block, when the state machine detects the first prefix value or the second prefix value in an address word received from the second address bus, the DMA controller storing in the source register or the destination register at least bits extracted from a first location in an address word comprising the first prefix value or bits extracted from a second location in an address word comprising the second prefix value, the location being located after the prefix value.

11. The system on a chip according to claim 10, wherein the memory management unit translates the received virtual address word into the corresponding physical address word according to a number p of first bits of the received virtual address word which determine a page.

12. The system on a chip according to claim 11, wherein the DMA controller extracts p bits following the prefix value of the address word when the prefix value of the address word is the first prefix value.

13. The system on a chip according to claim 12, wherein the DMA controller extracts N-p bits following the prefix value of the address word when the prefix value of the address word is the second prefix value.

14. The system on a chip according to claim 10, wherein the first module includes a first swap module for swapping the first N-p bits of a received virtual address word with the following p bits of the received virtual address word, and supplying the resulting virtual address word to the memory management unit.

15. The system on a chip according to claim 14, wherein the address processing block further includes a second module that receives the corresponding physical address word from the memory management unit, and the second module includes a module for determining whether a swap has been performed by the first swap module on the virtual address word corresponding to the received physical address word, and a second swap module for swapping the first p bits with the following N-p bits in a word supplied by the second module when it is determined that a swap has been performed by the first module, and supplying the resulting address word to the second address bus.

16. The system on a chip according to claim 15, wherein the memory management unit and a third address bus are included in separate components, and at least one of the second module and the second swap module is integrated in the component comprising the third bus or the component comprising the memory management unit.

17. The system on a chip according to claim 10, wherein the memory management unit and the central processing unit are included in separate components, and at least one of the first module and the routing block is integrated in either the component comprising the memory management unit or the component comprising the central processing unit.

18. The system on a chip according to claim 10, wherein the routing module comprises a bypass device for supplying a received address word directly to the second address bus if the second prefix value is detected.

19. The system on a chip according to claim 10, wherein the first module of the address processing block comprises a specific memory management unit for, from a received virtual address word that includes the first prefix value, delivering an address word including the first prefix value and bits obtained from translating the virtual address into a corresponding physical address in accordance with the table, the virtual address to be translated being determined at least partly according to predefined bits of the received virtual address word supplied which are located after the prefix value.

20. The system on a chip according to claim 10, wherein the state machine of the DMA controller selects one of the registers for storage as a function of at least one item of information supplied by the central processing unit to a data bus that couples the DMA controller and the central processing unit.

* * * * *